(12) United States Patent
Rhee et al.

(10) Patent No.: US 6,570,956 B1
(45) Date of Patent: May 27, 2003

(54) SEARCHING SYSTEM USING X-RAY AND MILLIMETER-WAVE SIGNAL

(76) Inventors: Jin-Koo Rhee, 26, Pil-Dong 3GA, Jung-Gu, C/O Dongkuk University, Seoul 100-715 (KR); Yeon-Sik Chae, 26, Pil-Dong 3GA, Jung-Gu, C/O Dongkuk University, Seoul 100-715 (KR); Hyun-Chang Park, 26, Pil-Dong 3GA, Jung-Gu, C/O Dongkuk University, Seoul 100-175 (KR)

( * ) Notice: Subject to any disclaimer, the term of this patent is extended or adjusted under 35 U.S.C. 154(b) by 106 days.

(21) Appl. No.: 09/755,897

(22) Filed: Jan. 4, 2001

(30) Foreign Application Priority Data

Nov. 27, 2000 (KR) .......................................... 2000-70981

(51) Int. Cl.⁷ .............................................. G01N 23/04
(52) U.S. Cl. ............................................ 378/57; 378/63
(58) Field of Search ............................. 378/57, 63, 62, 378/51; 342/22

(56) References Cited

U.S. PATENT DOCUMENTS

| | | | | |
|---|---|---|---|---|
| 3,713,156 A | * | 1/1973 | Pothier ........................ | 342/22 |
| 5,081,456 A | * | 1/1992 | Michiguchi et al. .......... | 342/22 |
| 5,168,224 A | * | 12/1992 | Maruizumi et al. ......... | 324/300 |
| 5,227,800 A | * | 7/1993 | Huguenin et al. .......... | 342/179 |
| 5,835,017 A | | 11/1998 | Ohkura et al. .............. | 340/573 |
| 5,963,248 A | | 10/1999 | Ohkawa et al. ............. | 348/169 |

FOREIGN PATENT DOCUMENTS

| | | | | |
|---|---|---|---|---|
| EP | 0 582 547 A1 | 2/1994 | ............ | H04N/1/40 |
| EP | 1 952 848 A1 | 11/2000 | .......... | H04N/5/235 |

\* cited by examiner

*Primary Examiner*—Drew A. Dunn
*Assistant Examiner*—Courtney Thomas
(74) *Attorney, Agent, or Firm*—Lee & Hong

(57) ABSTRACT

The present invention relates to a highly efficient searching system using a combination of X ray signal and millimeter wave signal, which allows a practical and effective method for searching human beings in public places where a level of security is required. Millimeter wave and X ray signal emitters and detectors are used to provide a processed image of a detected object, which is then analyzed and compared with objects in a stored database. Flagged objects then signal an alarm to alert security personnel.

1 Claim, 2 Drawing Sheets

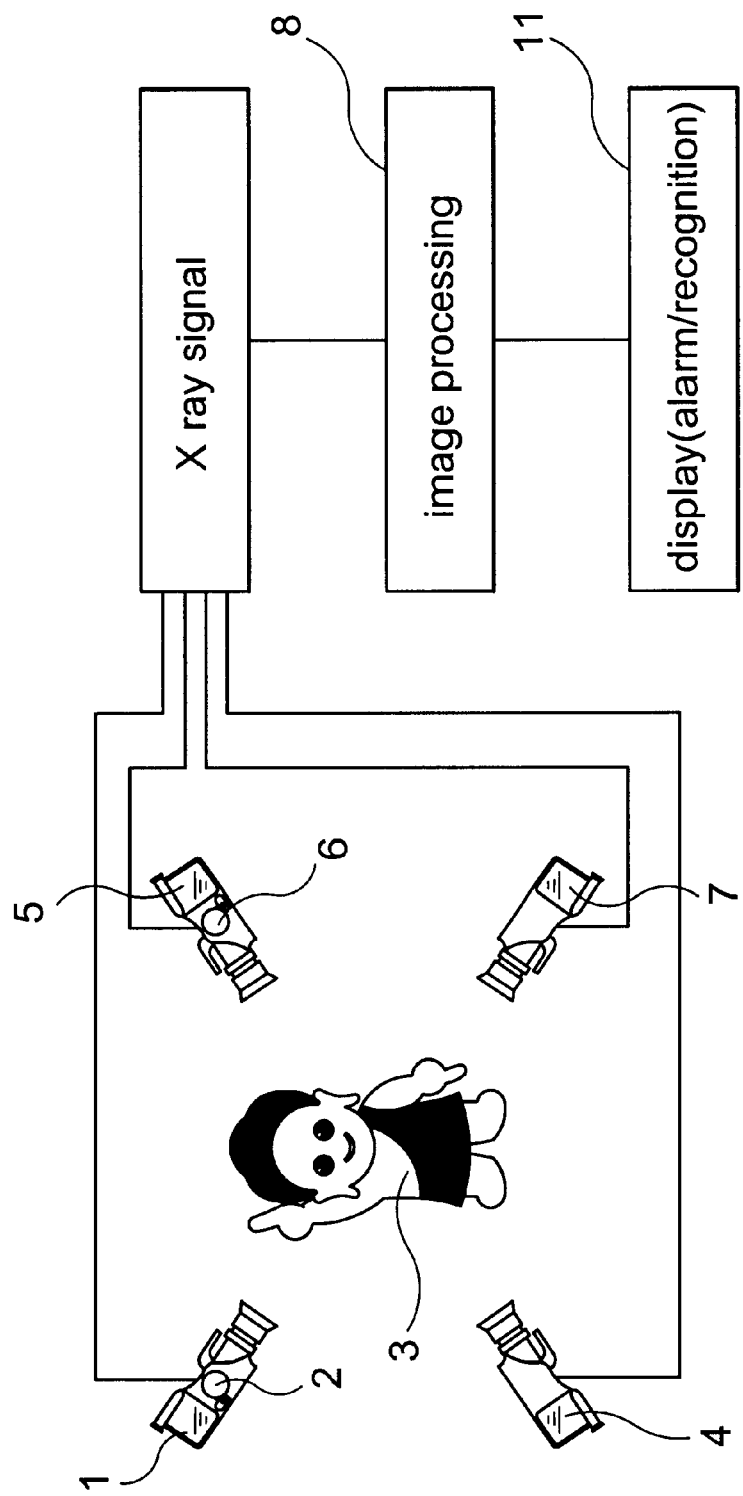

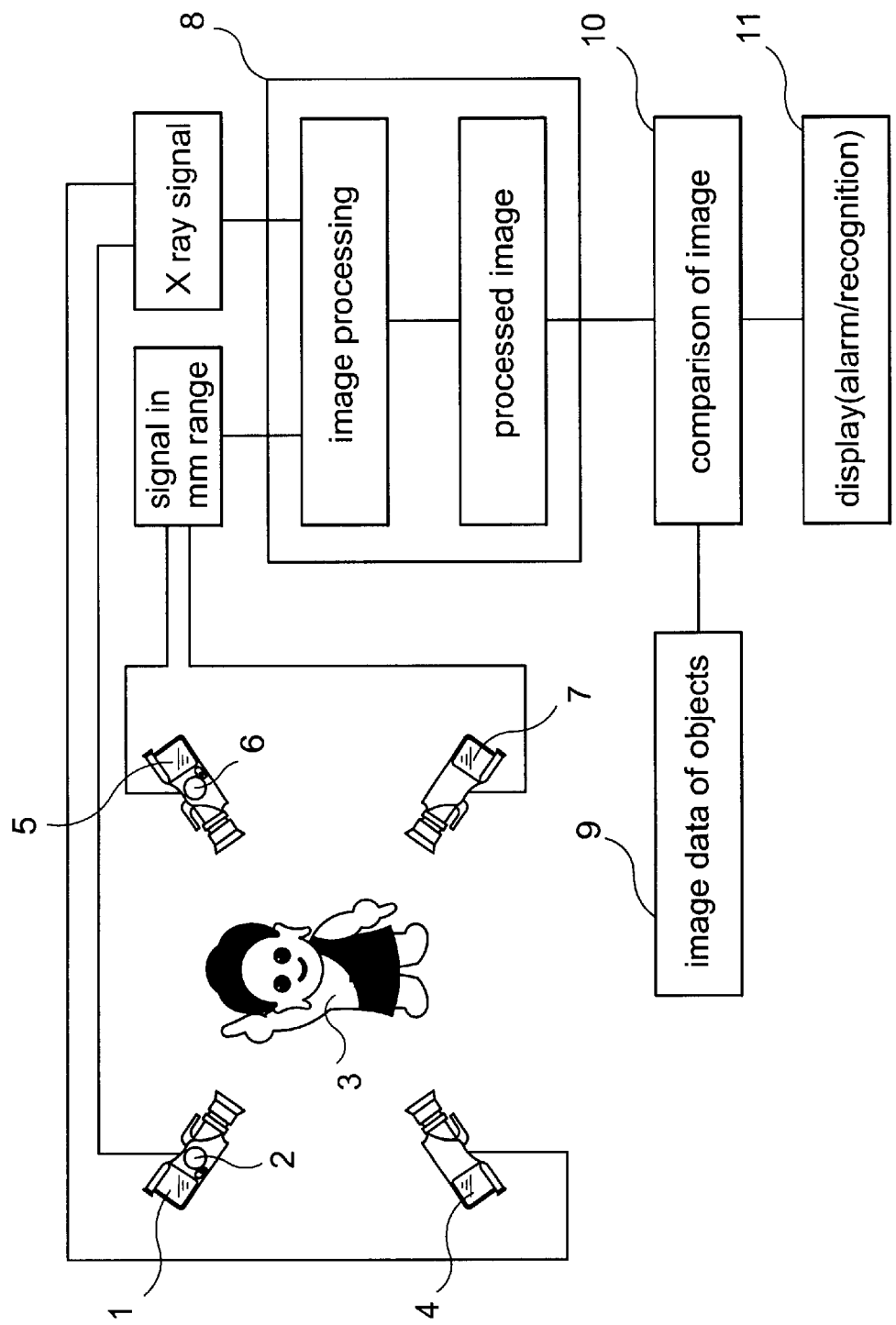

SEARCHING SYSTEM USING X-RAY AND MILLIMETER-WAVE SIGNAL

FIELD OF THE INVENTION

The present invention relates to a high efficient searching apparatus or processing technique using a combination of X ray signal and millimeter wave (EHF wave) signal, which allows a practical and effective method for searching human body to be conducted in air ports or harbors.

BACKGROUND OF THE INVENTION

The conventional searching apparatuses used to search weapons or the like hidden under clothes so on at air ports or harbors which regard the safety as the first priority depend on the method, wherein X ray, potentially very harmful to human body, is emitted, reflected and received for analytical evaluation.

The conventional apparatus, which was operated substantially as in FIG. 1, was hardly capable of a precise detection because the resolution of a searched object was much influenced by the environmental condition or other interference signal due to dependence on a signal of single band like X ray. This conventional searching apparatus comprising a radio transceiver, which employs only X ray signal, produces unclear image signal and tends to malfunction, and therefore secondary individual confirmation by a security officer should follow after passengers have passed the searching stand, imparting displeasure to the passengers and causing delay as main problems.

SUMMARY OF THE INVENTION

The object of the invention is to provide a searching apparatus using a combination of X ray signal and millimeter wave (EHF wave) signal, which operates stably under various environmental conditions, can search and detect ultra small objects unmanned and can give clear and precise images of objects.

To that end, the present invention is characterized by including a technique for embodying an emitter module for producing radio signal, which module includes an electronic element for generating signal in the wave length range of millimeters, and for embodying a detector module for receiving signals; a technique for signal-processing in combination of the X ray in the conventional searching apparatus; and a technique for comparing the embodied image with other stored data and giving alarm as required.

BRIEF DESCRIPTION OF THE INVENTION

FIG. 1 shows the arrangement for a conventional searching system using X ray signal, and FIG. 2 shows the arrangement for a searching system using the combination of X ray and millimeter wave signal according to the present invention.

DETAILED DESCRIPTION OF THE INVENTION

A preferred embodiment of the invention will be described in detail by referring to the accompanying drawing.

As can be seen in FIG. 2, the present invention which relates to a high efficient searching apparatus has the following constructional features: An X ray signal emitter 1 which has an electronic element 2 for producing X ray signal and includes an X ray signal detector 4 for receiving an X ray signal is provided. A millimeter wave emitter 5 is also provided in a millimeter wave transceiver and includes an electronic element 6 for producing millimeter wave. The transceiver described above also includes a millimeter wave detector 7 for receiving millimeter wave. The apparatus according to the invention is also provided with an image processor 8 for deducing image of an object from the received X ray and millimeter wave signals and with a comparator 10 for comparing the deduced image with the corresponding data from the image data base for objects 9 already input. A display 11 for displaying the image deduced from the image processor 8 and for giving an alarm as required is included in the apparatus as well.

Now, an example of operating method is described in detail by referring to the accompanying drawings.

When a man 3 passes through a body searching stand at an airport or harbor, the X ray signal output from the X ray signal emitter 1 which has an electronic element 2 for producing X ray signal and the millimeter wave signal output from the millimeter wave emitter 5 which composes a millimeter wave transceiver together with the detector 7 and includes the electronic element 6 for producing millimeter wave are respectively received by the X ray signal detector 4 and millimeter wave 7. The two signals received, i.e. X ray signal and millimeter wave signal, are transmitted to the image processing section 8 for producing image.

The image processed in the image processing section 8 is compared with the corresponding data from the image data base for objects 9 already stored to detect any abnormal object. The image data having passed the above-described comparator 10 is transferred to the display 11 to display for the user and to produce an alarm signal if an abnormal object is detected.

Thus, because the high efficient searching apparatus based on the example of the invention as described above employs the combination of X ray signal and millimeter ray signal, it has an improved resolving power so as to reveal any hidden product on human body effectively and has an operating characteristic stable to environmental disturbance so as to minimize the error rate for the transmission of radio signal, with the result that the reliability of the apparatus is remarkably improved.

It is to be understood that, while the invention was described mainly with respect to a preferable specific embodiment, the invention is not restricted to that embodiment and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. A searching system using a combination of X-ray and millimeter wavelength signals, the system comprising:

an X-ray signal emitter including an electronic element producing an X-ray signal;

an X-ray signal detector for receiving the X-ray signal;

a millimeter wavelength signal emitter provided in a millimeter wavelength signal transceiver and including an electronic element for producing a millimeter wavelength signal;

a millimeter wavelength signal detector for receiving the millimeter wavelength signal;

an image processor for producing an image of an object from the received X-ray and millimeter wavelength signals;

a comparator for comparing the produced image with corresponding image data stored in an image database; and a display for displaying the produced image and for providing an alert when the produced image corresponds to one or more image data stored in the image database.

* * * * *